April 8, 1958     F. E. TAYLOR     2,830,168
METHOD OF MANUFACTURING VEHICLE WHEELS AND THE LIKE
Filed July 30, 1954     2 Sheets-Sheet 1
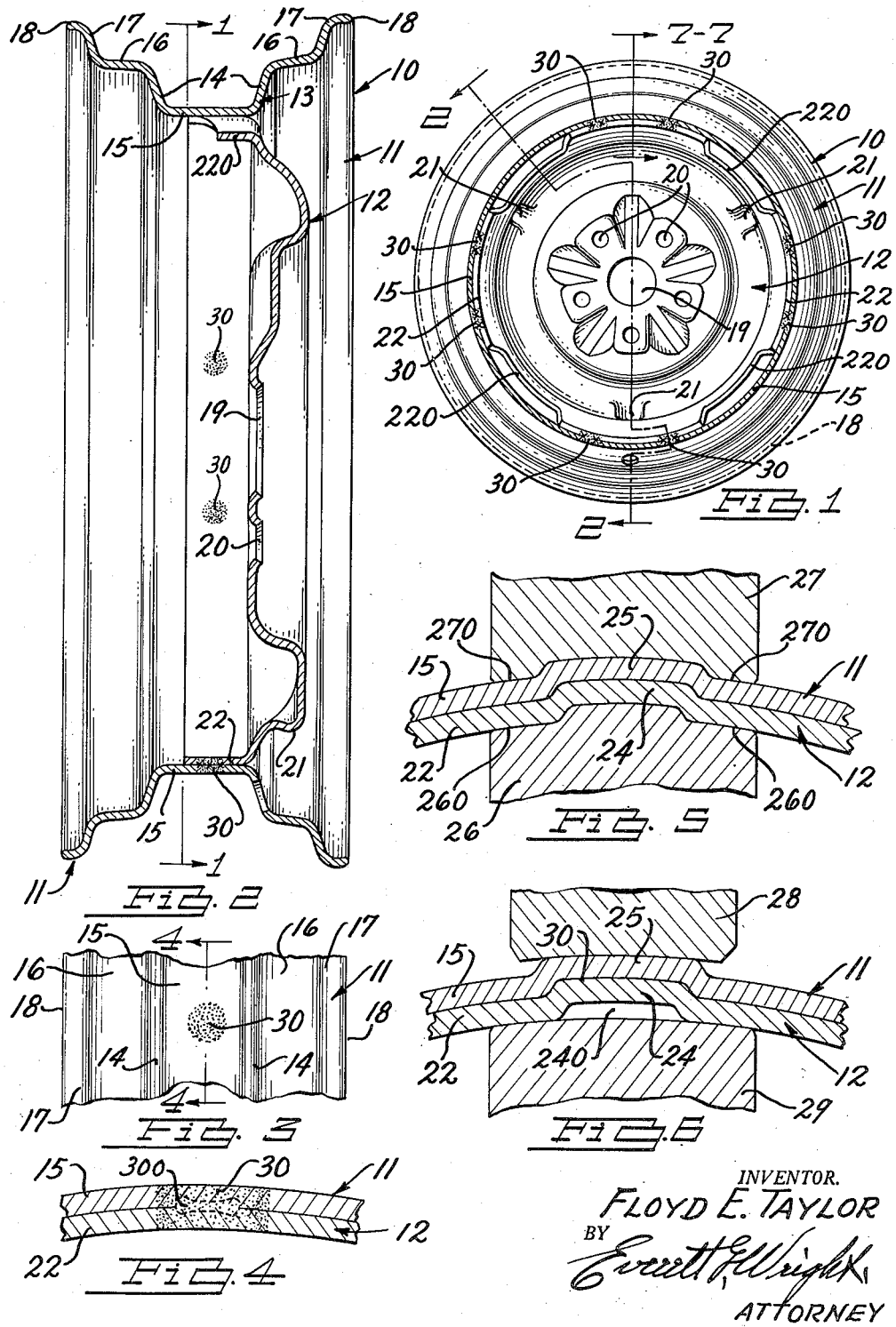
INVENTOR.
FLOYD E. TAYLOR
BY
ATTORNEY April 8, 1958    F. E. TAYLOR    2,830,168
METHOD OF MANUFACTURING VEHICLE WHEELS AND THE LIKE
Filed July 30, 1954    2 Sheets-Sheet 2

INVENTOR.
FLOYD E. TAYLOR
BY
ATTORNEY

United States Patent Office 2,830,168
Patented Apr. 8, 1958

2,830,168

METHOD OF MANUFACTURING VEHICLE WHEELS AND THE LIKE

Floyd E. Taylor, Bloomfield Hills, Mich., assignor to Swift Electric Welder Company, a corporation of Michigan Application July 30, 1954, Serial No. 446,750

9 Claims. (Cl. 219—91)

This invention relates to improvements in the manufacture of vehicle wheels and like elements having frictionally mated parts.

In the manufacture of steel wheels for passenger cars, trucks and the like, a drop center rim is butt welded and formed into annular shape having the proper diameter and configuration. Into the drop center rim is pressed a circular flanged spider which is riveted or spot resistance welded to the base of the central channel of the drop center rim. Spot resistance welding of the spider flange to the rim has largely replaced the riveting of these parts together inasmuch as riveting proved to be unsatisfactory due to lack of uniformity in the securement of the spider to the rim and because of rusting at or around the rivets.

The spot resistance welding of the spider flange to the rim, although an improvement over riveting of these parts together, has also proven to be unreliable due to inaccuracies in the fit between the spider flanges and the rim when pressed in telescopic relationship within the rim. Also, it is a practical impossibility to clamp the parts together during the weld because of the relatively limited pressure that can be applied to the parts by welding electrodes. Even though the welding electrode pressure presses the metal together between the electrodes at the weld when the metal becomes ductile at welding temperatures, the adjacent metal is not pressed together. Ofttimes a burning occurs at the weld due to insufficient contact between the adjacent parts, which burning continues until the metal becomes sufficiently hot at the electrodes to become ductile and pressed tightly together under the welding pressure normally available. This burning creates imperfect welds, and the fact that the pieces to be welded together are not always in uniform contact at the beginning of the welding operation prevents the attainment of uniformly satisfactory welds with a given welding current. This is because it is impractical in production welding to adjust the welding current and welding cycle to compensate for irregularities in the mating of the work to be welded.

With the foregoing in view, the primary object of the invention is to provide an improved method of manufacturing vehicle wheels and the like wherein assembled frictionally juxtaposed but not accurately mated parts are first coined to provide a positive intimately mated upset at selected weld points, and are then resistance welded at such weld points with sufficient welding pressure to re-form the metal substantially to its original configuration whereby to weld the said parts together with a uniformly high strength fused mechanical interlock at the re-formed mated upset.

Another object of the invention is to provide an improved method of manufacturing vehicle wheels comprising the coining of the frictionally juxtaposed flange and rim at and adjacent to weld points to close the gaps therebetween and set the said frictionally juxtaposed elements into a positive intimate mated relationship whereby to establish a uniform welding condition at all times to assure high strength uniform finished welds with less welding time.

Other objects of the invention will become apparent by reference to the following detailed description taken in connection with the accompanying drawing, in which:

Fig. 1 is a vertical sectional view through a vehicle wheel manufactured in accordance with the improved method.

Fig. 2 is a cross sectional view taken on the line 2—2 of Fig. 1.

Fig. 3 is a fragmentary plan view at a completed weldment.

Fig. 4 is an enlarged fragmentary longitudinal sectional view taken on the line 4—4 of Fig. 3 through a completed weldment having a fused mechanical interlock.

Fig. 5 is a more or less diagrammatic view at a point of weld showing a preferred coining of frictionally juxtaposed portions of the wheel rim and the spider bringing them into accurately mated contact.

Fig. 6 is a more or less diagrammatic view similar to Fig. 5 showing an accurately mated coined portion of the frictionally juxtaposed portions of the wheel rim and spider positioned between welding electrodes at the beginning of a resistance-welding operation to re-form the parts and accomplish the fused mechanically interlocked weldment indicated in Fig. 4.

Figure 7:
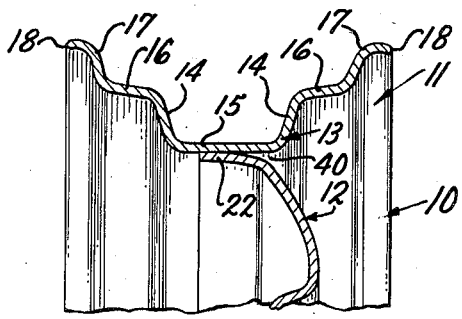
Fig. 7 is an enlarged cross sectional view showing one type of an inaccurate juxtaposition of a wheel spider flange and wheel rim that ofttimes occurs after the spider has been pressed within the wheel rim.
Figure 8:
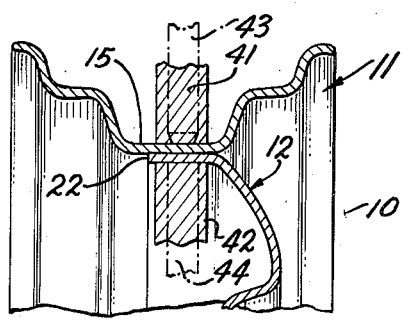
Fig. 8 shows more or less diagrammatically how the faulty juxtaposition of the wheel parts shown in Fig. 7 may be corrected by relatively high pressure coining prior to welding.

Referring now to the drawing wherein like numerals refer to like and corresponding parts throughout the several views, the improved method of securing frictionally juxtaposed assemblies such as wheel elements together in accordance with the invention is disclosed in Figs. 1–6 inclusive in connection with a drop center type vehicle wheel 10 composed of a drop center rim 11 and a spider 12.

In such wheels, the drop center rim 11 is usually rolled from a butt welded annular blank to the desired cross sectional configuration. The finished drop center rim 11 is preferably composed of a central channel 13 having side walls 14 and a base 15, a tire bead seat 16 extending laterally outwardly from each of the said channel side walls 14, and a curved flange 17 extending upwardly and outwardly from each tire bead seat 16, the said flanges 17 terminating in an outer lip 18 at each side of the wheel rim. The spider 12 is generally provided with a suitable hub aperture 19, wheel securing bolt holes 20 and a plurality of hub cap nubs 21 by means of which a hub cap, not shown, is removably secured to the wheel. The outer periphery of the spider 12 is preferably flanged at 22 to conform in frictional fitting relationship to the inner periphery of the base 15 of the central channel 13 of the drop center rim 11 when pressed therein. It will be noted that the flange 22 of the spider 12 is scalloped at 220 at suitable intervals to provide structural strength and vents through the wheel 10, and for the purpose of ease in pressing it within the drop center rim 11.

After the spider 12 is press assembled in its proper relationship within the rim 11, the flange 22 of the spider 12 and the base 15 of the rim 11 are coined simultaneously at 24 and 25 between coining dies 26 and 27 as shown more or less diagrammatically in Fig. 5 to provide points of weld. This coining may be accomplished simultaneously at pairs of points of weld, sequentially at single points of weld, sequentially at multiple weld points, or simultaneously at all points of weld, all depending upon the equipment employed. The coining dies 26 and 27 each have work clamping portions 260 and 270 at each side of the coins 24 and 25 to form the work adjacent said coins to assure proper contact of the spider 12 and rim 11 adjacent the shoulders of the coins before welding, such clamping portions 260 and 270 being formed to the finished radius of the work pieces clamped together during the coining operation.

After coining, the spider 12 and rim 11 are welded together at 30 between electrodes 28 and 29 formed to the finished radius of the work pieces, the electrode 28 contacting the coin 25 and electrode 29 contacting the spider 22 and arcuately bridging over the recess 240 at the coin 24. When two adjacent or multiple welds 30 are made simultaneously, the electrode 29 preferably extends along the spider 22 a sufficient distance to arcuately bridge the recesses 240 at the several weld points.

During the welding of the work together at the mated coins 25 and 24, the coined portions of the spider 12 and rim 11 are re-formed under welding heat and pressure with the result that a fused mechanical interlock occurs at 300 at the weld 30, which fused mechanical interlock, as nearly as can be determined, occurs during the welding cycle when the welding heat and pressure become sufficient to collapse the mated coins. It should be noted that the welding current passes through the intimately mated coins in a manner different than in spot or projection welding, the passage of the welding current through the mated coins heats the mated coins substantially to welding temperature before the coins collapse providing a fused mechanical interlock which is to be distinguished from the burning and melting down of the projection in projection welding.

It has been found by actual test that wheel weldments accomplished according to the improved method are more uniform in resistance to shear and have a higher strength than welds accomplished by methods presently employed.

Referring now to Figs. 7–12 inclusive, several faulty juxtapositions of wheel spider flanges 22 within a drop center wheel rim 11 have been illustrated together with the method of correcting the same by relatively high pressure coining prior to welding.

Fig. 7 shows a faulty juxtaposition at 40 of the flange 22 of the spider 12 often having been pressed within the base 15 of the central channel 13 of the wheel rim 11. This faulty juxtaposition of parts is corrected by a flat coining of the parts together between coining dies 41 and 42 under pressures considerably greater than the maximum attainable between welding electrodes, and then welding the parts together between welding electrodes 43 and 44. To accomplish the flat coining, the coining dies 41 and 42 are preferably formed arcuately to the radius of the top of the base 15 of the central channel 13 of the wheel rim 11 and to the radius of the bottom of the flange 22 of the wheel spider 12.

Figure 9:
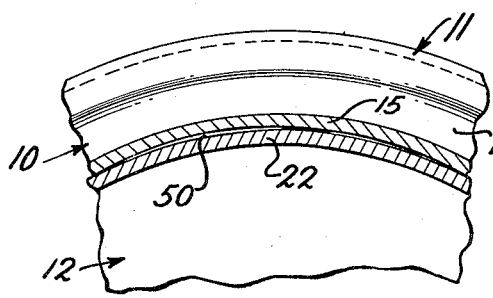
Fig. 9 is an enlarged longitudinal sectional view showing another type of an inaccurate juxtaposition of a wheel spider flange and wheel rim that occurs after the spider has been pressed within the wheel rim.
Figure 10:
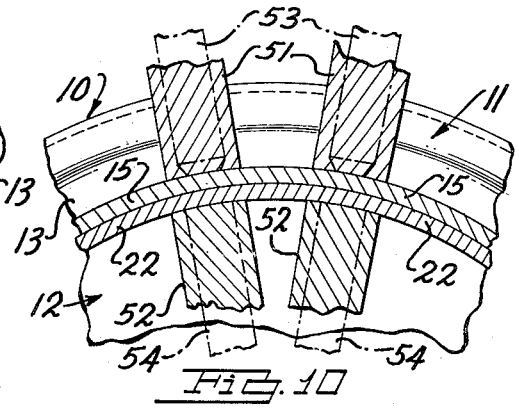
Fig. 10 shows more or less diagrammatically how the faulty juxtaposition of the wheel parts shown in Fig. 9 may be corrected by relatively hgh pressure coining prior to welding.

Likewise, Figs. 9 and 10 show the flat coining of an irregular contact 50 between the flange 22 of the spider 12 and the base 15 of the central channel 13 of the rim 11 after the spider 12 has been pressed within the rim 11, the flat coining being accomplished between suitably formed coining dies 51 and 52 at pressures much greater than can be employed between welding electrodes. After the coining of the parts into intimate uniform contact, they are welded together between welding electrodes 53 and 54.

Figure 11:
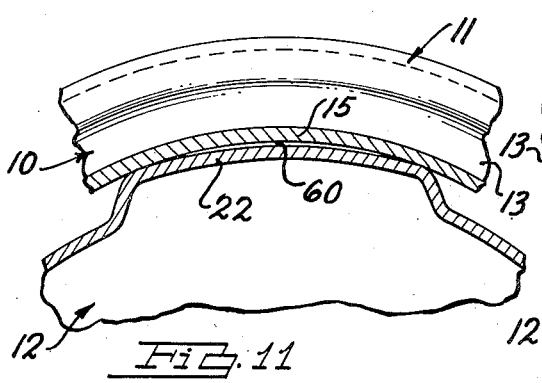
Fig. 11 is an enlarged longitudinal sectional view showing still another type of an inaccurate juxtaposition of a wheel spider flange and wheel rim that occurs after the spider has been pressed within the wheel rim.
Figure 12:
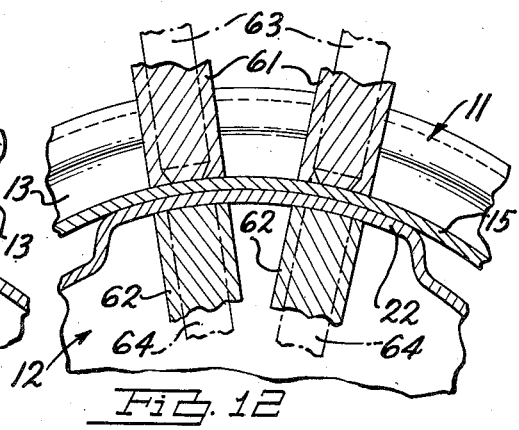
Fig. 12 shows more or less diagrammatically how the faulty juxtaposition of the wheel parts shown in Fig. 9 may be corrected by relatively high pressure coining prior to welding.

Figs. 11 and 12 show the flat coining of the flange 22 of the spider 12 into uniform contact with the base 15 of the central channel 12 of the rim 11 to close the gap 60 ofttimes occurring between the parts as a result of pressing the flange 22 of the spider 12 within the rim 11. The closing of the gap 60 is accomplished by suitably formed coining dies 61 and 62 under pressures much greater than can be applied by welding electrodes. After coining the gap 60 closed to place the spider flange 22 and rim 11 into intimate contact, the welding of the parts together is accomplished between welding electrodes 63 and 64.

The flat coining of juxtaposed spider flange 22 and rim 11 together as indicated in Figs. 7–12 inclusive accomplishes an intimate uniform contact between the wheel parts prior to welding which assures uniformly strong positive weldments with normal electrode pressures, less welding current and less burning at the welds.

Although but several specific embodiments of the invention have been shown in the drawings and modifications thereof have been described in the specification, it is obvious that many changes may be made in the details of carrying out the improved method, all without departing from the spirit and scope of the invention as defined by the appended claims.

I claim:

1. The method of joining together the rim and spider of vehicle wheels of the type composed of a rim and a flanged spider pressed into frictional engagement within said rim comprising coining the rim and spider flange simultaneously into intimate mated relationship at selected areas, and then resistance welding the rim and spider flange together at the coined areas under electrode pressure sufficient to re-form the coined areas.

2. The method of joining together the rim and spider of vehicle wheels of the type composed of a rim and a flanged spider pressed into frictional engagement within said rim comprising coining the rim and spider flange simultaneously into intimate mated upset relationship at points of weld, and then resistance welding the rim and spider flange together at the coined areas under sufficient electrode pressure to re-form the rim and flange thereat into their original curvature.

3. The method of joining together the rim and spider of vehicle wheels of the type composed of a rim and a flanged spider pressed into frictional engagement within said rim comprising coining the rim and spider flange into intimate mated upset relationship at points of weld simultaneously with flat coining the rim and spider adjacent the upset areas into intimate contact on the curvature of the completed assembly, and then resistance welding the rim and spider flange together at said upset areas under sufficient electrode pressure to collapse the upset during the welding cycle to provide a fused mechanical interlock and re-form the rim and flange substantially into the curvature of the completed assembly.

4. The method of joining together the rim and spider of vehicle wheels of the type composed of a rim and a flanged spider pressed into frictional engagement within said rim comprising coining the rim and spider flange into intimate mated upsets at selected areas simultaneously with clamping the rim and spider adjacent the coined areas into intimate contact on the curvature of the completed assembly, and then resistance welding the rim and spider flange together at said upsets under sufficient electrode pressure while supporting the wheel under said weld to collapse the upsets and re-form the rim and flange substantially into the curvature of the completed assembly.

5. The method of fixing together frictionally juxtaposed parts comprising coining the parts simultaneously into intimately contacting mated upsets while clamping the parts adjacent said coins into intimate contact, and then resistance welding the said parts together at said upsets simultaneously with re-forming the upsets substantially into their original form.

6. The method of fixing together frictionally juxtaposed parts comprising coining the parts simultaneously into intimately contacting mated upsets while clamping the parts adjacent said coins into intimate contact, and then resistance welding the said parts together at said upsets simultaneously with re-forming the upsets substantially into their original form but with a fused mechanical interlock between said parts.

7. The method of fixing together curved frictionally assembled parts comprising coining the parts into intimately contacting mated upsets simultaneously with clamping the parts around the mated upsets in intimate contact on the finished curvature of the assembly, and then resistance welding said parts together at said mated upsets collapsing and re-forming the mated upsets substantially into the curvature of the finished assembly while supporting one part over an area materially in excess of the recess formed by said coining operation.

8. The method of fixing together curved frictionally assembled parts comprising coining the parts into intimately contacting mated upsets simultaneously with clamping the parts around the mated upsets in intimate contact on the finished curvature of the assembly, said mated upsets being proportioned to permit their collapsing during welding to form a fused mechanical interlock between the parts at the weld, and then resistance welding said parts together at said mated upsets collapsing and re-forming the mated upsets substantially into the curvature of the finished assembly while supporting one part over an area materially in excess of the recess formed by said coining operation.

9. The method of fixed parts together comprising coining the parts into intimate contact at unit pressures greater than attainable between welding electrodes simultaneously with forming an upset therein having walls collapsible during welding, and then resistance welding the parts together at said upsets collapsing said upsets during the welding operation and forming a fused mechanical interlock at said weld.

References Cited in the file of this patent

UNITED STATES PATENTS

| | | |
|---|---|---|
| 1,261,943 | Lashar | Apr. 9, 1918 |
| 1,564,738 | Williams | Dec. 8, 1925 |
| 1,741,716 | Hunt | Dec. 31, 1929 |
| 1,749,917 | Meadowcroft | Mar. 11, 1930 |
| 1,990,738 | La Porte | Feb. 12, 1935 |

FOREIGN PATENTS

| | | |
|---|---|---|
| 683,411 | Germany | Nov. 6, 1939 |